(12) United States Patent
Brimeyer et al.

(10) Patent No.: US 10,405,474 B2
(45) Date of Patent: Sep. 10, 2019

(54) MULTILINK CONNECTION BETWEEN HARVESTING HEAD ADAPTER FRAME AND MAINFRAME

(71) Applicant: Deere & Company, Moline, IL (US)

(72) Inventors: Alex Brimeyer, Bettendorf, IA (US); Eric Taflinger, Eldridge, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/582,757

(22) Filed: Apr. 30, 2017

(65) Prior Publication Data

US 2018/0310457 A1    Nov. 1, 2018

(51) Int. Cl.
| | | |
|---|---|---|
| *A01D 41/16* | (2006.01) | |
| *A01B 59/00* | (2006.01) | |
| *A01B 59/06* | (2006.01) | |
| A01D 34/04 | (2006.01) | |
| A01D 61/00 | (2006.01) | |
| A01D 61/02 | (2006.01) | |

(52) U.S. Cl.
CPC .......... *A01B 59/002* (2013.01); *A01B 59/064* (2013.01); *A01D 41/16* (2013.01); *A01D 34/04* (2013.01); *A01D 61/008* (2013.01); *A01D 61/02* (2013.01)

(58) Field of Classification Search
CPC .... A01B 59/002; A01B 59/064; A01D 41/16; A01D 61/02; A01D 34/04; A01D 61/008
See application file for complete search history.

(56) References Cited

U.S. PATENT DOCUMENTS

| | | | | |
|---|---|---|---|---|
| 3,468,107 | A | * | 9/1969 | Lely Cornelis Van Der .............. A01D 41/144 56/11.9 |
| 3,683,601 | A | * | 8/1972 | Van der Lely ....... A01D 41/144 56/6 |
| 3,959,957 | A | * | 6/1976 | Halls ...................... A01D 41/14 56/15.8 |
| 4,177,627 | A | | 12/1979 | Cicci |
| 4,206,582 | A | * | 6/1980 | Molzahn .............. A01D 41/145 56/15.8 |
| 4,409,780 | A | * | 10/1983 | Beougher .............. A01B 73/02 172/456 |
| 4,527,381 | A | * | 7/1985 | Mann ..................... A01D 67/00 56/16.2 |
| 4,956,966 | A | * | 9/1990 | Patterson ............... A01D 41/14 56/181 |
| 5,157,905 | A | * | 10/1992 | Talbot .................... A01D 41/14 56/15.9 |
| 5,464,371 | A | * | 11/1995 | Honey ................... A01D 41/14 460/20 |

(Continued)

OTHER PUBLICATIONS

European Patent Office Search Report and Search Opinion for Application No. 18169485.2 dated Oct. 8, 2018 (7 pages).

*Primary Examiner* — Arpad Fabian-Kovacs
(74) *Attorney, Agent, or Firm* — Michael Best Friedrich LLP

(57) ABSTRACT

An agricultural harvesting head for mounting on a feederhouse of an agricultural combine has an adapter frame coupled to and supported on a center frame section with four links. Each link extends between and is pivotally coupled to the center frame section at a forward end of the link and is pivotally coupled to the adapter frame at a rear end of the link.

15 Claims, 8 Drawing Sheets

(56) References Cited

U.S. PATENT DOCUMENTS

| | | | |
|---|---|---|---|
| 5,473,872 A * | 12/1995 | Fox | A01B 71/06 180/53.1 |
| 5,906,089 A * | 5/1999 | Guinn | A01D 41/145 56/10.2 E |
| 5,918,448 A * | 7/1999 | Wheeler | A01D 75/287 56/10.2 E |
| 5,964,077 A * | 10/1999 | Guinn | A01D 41/14 56/10.2 E |
| 6,510,680 B2 * | 1/2003 | Uhlending | A01D 75/287 56/10.2 E |
| 6,675,568 B2 * | 1/2004 | Patterson | A01D 41/14 56/208 |
| 6,813,873 B2 * | 11/2004 | Allworden | A01D 41/141 56/10.2 E |
| 7,191,582 B2 * | 3/2007 | Bomleny | A01D 41/141 56/10.2 E |
| 7,207,164 B2 * | 4/2007 | Bomleny | A01D 41/141 56/10.2 E |
| 7,222,475 B2 * | 5/2007 | Bomleny | A01D 41/141 56/10.2 E |
| 7,430,846 B2 * | 10/2008 | Bomleny | A01D 41/141 56/10.2 E |
| 7,470,180 B2 * | 12/2008 | Honey | A01D 41/16 460/105 |
| 7,661,251 B1 * | 2/2010 | Sloan | A01D 41/141 56/10.2 E |
| 7,918,076 B2 * | 4/2011 | Talbot | A01D 41/14 56/208 |
| 7,971,420 B1 * | 7/2011 | Bollin | A01D 41/145 56/208 |
| 8,079,204 B2 * | 12/2011 | Coers | A01D 41/14 56/15.8 |
| 8,245,489 B2 * | 8/2012 | Talbot | A01D 41/141 56/10.2 E |
| 8,401,745 B2 * | 3/2013 | Otto | A01D 41/145 701/50 |
| 8,511,049 B2 | 8/2013 | Thompson et al. | |
| 8,560,182 B2 * | 10/2013 | Ringwald | A01D 46/08 56/10.2 E |
| 8,769,920 B2 * | 7/2014 | Patterson | A01D 43/06 56/228 |
| 8,826,635 B2 * | 9/2014 | Schraeder | A01D 41/145 56/10.2 E |
| 8,881,495 B2 * | 11/2014 | Lohrentz | A01D 47/00 56/10.2 E |
| 9,357,706 B2 * | 6/2016 | Lohrentz | A01D 41/145 |
| 9,485,908 B2 | 11/2016 | Verhaeghe et al. | |
| 9,717,181 B2 * | 8/2017 | Boyd, III | A01D 41/16 |
| 9,730,375 B2 * | 8/2017 | De Coninck | A01B 63/008 |
| 9,775,291 B2 * | 10/2017 | Neudorf | A01D 41/145 |
| 9,867,324 B2 * | 1/2018 | De Coninck | A01B 63/004 |
| 9,968,034 B2 * | 5/2018 | De Lathauwer | A01D 67/005 |
| 2004/0006958 A1 * | 1/2004 | Thiemann | A01D 41/141 56/10.2 R |
| 2004/0040276 A1 * | 3/2004 | Allworden | A01D 41/141 56/10.2 R |
| 2007/0214760 A1 * | 9/2007 | Bomleny | A01D 41/141 56/10.2 E |
| 2008/0161077 A1 * | 7/2008 | Honey | A01D 41/16 460/106 |
| 2010/0043368 A1 * | 2/2010 | Sloan | A01D 41/141 56/10.2 E |
| 2010/0071330 A1 * | 3/2010 | Coers | A01D 41/14 56/10.6 |
| 2013/0097986 A1 * | 4/2013 | Lovett | A01D 41/14 56/153 |
| 2014/0215992 A1 * | 8/2014 | Schraeder | A01D 41/145 56/14.7 |
| 2015/0033692 A1 * | 2/2015 | Schroeder | A01D 34/008 56/10.2 E |
| 2015/0271999 A1 * | 10/2015 | Enns | G05B 15/02 700/275 |
| 2016/0150716 A1 * | 6/2016 | De Coninck | A01B 63/008 56/153 |
| 2016/0165796 A1 | 6/2016 | Carpenedo | |
| 2016/0183461 A1 * | 6/2016 | Neudorf | A01D 41/14 56/158 |
| 2016/0278276 A1 * | 9/2016 | De Coninck | A01B 63/004 |
| 2018/0035598 A1 * | 2/2018 | Wenger | A01B 73/065 |

* cited by examiner

MULTILINK CONNECTION BETWEEN HARVESTING HEAD ADAPTER FRAME AND MAINFRAME

FIELD OF THE INVENTION

This invention relates generally to agricultural harvesters. More particularly it relates to agricultural harvesting heads. More particularly it relates to agricultural harvesting heads for agricultural combines.

BACKGROUND OF THE INVENTION

Agricultural harvesters, such as agricultural combines, are designed to travel through agricultural fields harvesting crops. Agricultural combines receive crop severed from the ground and convey it to threshing, separating and cleaning devices within the agricultural combine.

In a typical arrangement, the agricultural harvesting head severs the crop from the ground and conveys it to the central region of the harvesting head where it is then conveyed rearward into a central and forwardly opening aperture in the front of the agricultural combine proper.

Agricultural harvesting heads are quite long, on the order of 10-15 m in overall length. In order to accurately follow the contours of the ground and sever crop at the appropriate point on the stem, agricultural harvesting heads have been made in sections that are generally hinged with respect to each other. A typical agricultural harvesting head of this type is formed in two or three sections that are pivotable with respect to each other. They pivot with respect to each other about a generally horizontal and fore-and-aft extending axis. Thus, a two section agricultural harvesting head would have one pivot axis, and a three-section agricultural harvesting head would have two pivot axes.

To better follow the contours of the ground, the agricultural harvesting head is mounted to the front of the feederhouse such that it can move with respect to the feeder house.

In one arrangement (U.S. Pat. No. 6,675,568 B2) the agricultural harvesting head is a draper head having three frame sections (a center section, a left-wing section and a right wing section). In this arrangement each of the wing sections are hinged with respect to the center section about two pivot joints with pivot pins (see: FIG. 6, items 17H, 27; FIG. 20, items 71A, 71B). The pivot joints permit the left wing section and the right wing section to pivot up and down with respect to the center frame section and thereby follow the contours of the ground.

In addition to that contour-following capability, the center frame section is mounted on an "adapter" that is fixed to the front of the feeder house. This adapter permits the center frame section to move up and down with respect to the front of the feederhouse. It also permits the wing sections to move up and down with respect to the front of the feederhouse, since they are attached to and supported on the center frame section.

The range of motion provided by the adapter of the '568 patent is limited, however. What is needed is an adapter arrangement that provides a greater range of movement, mechanical strength, and stiffness. It is an object of this invention to provide such a device.

SUMMARY OF THE INVENTION

In accordance with a first aspect of the invention, and agricultural harvesting head for an agricultural harvester comprises: a left frame section disposed to receive crop harvested on a left side of the agricultural harvesting head; a right frame section disposed to receive crop harvested on the right side of the agricultural harvesting head; a center frame section that is coupled to and disposed to receive the crop harvested from the left frame section and from the right frame section; an adapter frame disposed behind the center frame section; and an upper left link, and upper right link, a lower left link, and a lower right link that the adapter frame to the center frame section.

Each of the four links may have a forward end pivotally coupled to the center frame section and a distal end pivotally coupled to the adapter frame.

Each of the four links may extend generally fore-and-aft.

The upper left link and the upper right link may extend forwardly and outwardly from their mounting points on the adapter frame to their mounting points on the center frame section.

The lower left link and the lower right link may extend forwardly and inwardly from their mounting points on the adapter frame to their mounting points on the center frame section.

The center frame section may further comprise two laterally spaced apart vertical side members, an upper horizontal member, and a lower horizontal member, wherein the two vertical side members and the upper and lower horizontal members may be fixed together at their ends to define a central aperture that is dimensioned to pass substantially all crop harvested by the agricultural harvesting head, wherein the central aperture may have an upper left corner, an upper right corner, a lower left corner, and a lower right corner, and wherein each of the four links may be pivotally coupled at its forward end adjacent to the center frame section at one of the four corners.

The adapter frame may further comprise two additional laterally spaced apart vertical side members, an additional upper horizontal member, and an additional lower horizontal member. The two additional vertical side members and the additional upper and lower horizontal members may be fixed together at their ends to define a central aperture that is dimensioned to pass substantially all crop harvested by the agricultural harvesting head, wherein the central aperture has an upper left corner, an upper right corner, a lower left corner, and a lower right corner. Each of the four links may be pivotally coupled at its rear end adjacent to the adapter frame at one of the four corners.

The upper left link and the upper right link may be coplanar with a first plane.

The lower left link and the lower right link may be coplanar with a second plane.

The first plane and the second plane may extend forward and upward in at least one operating position.

The upper left link and the upper right link may be shorter than the lower left link and the lower right link.

The upper left link and the upper right link may have the same length, and the lower left link and the lower right link may have the same length.

The upper left blank and the upper right link may comprise turnbuckles.

The lower left link and the lower right link may comprise turnbuckles.

The upper left link and the upper right link may have means for adjusting their length without removing the agricultural harvesting head from the agricultural combine means for adjusting their length without removing the agricultural harvesting head from the agricultural combine.

DETAILED DESCRIPTION OF THE PREFERRED EMBODIMENTS

Figure 1:
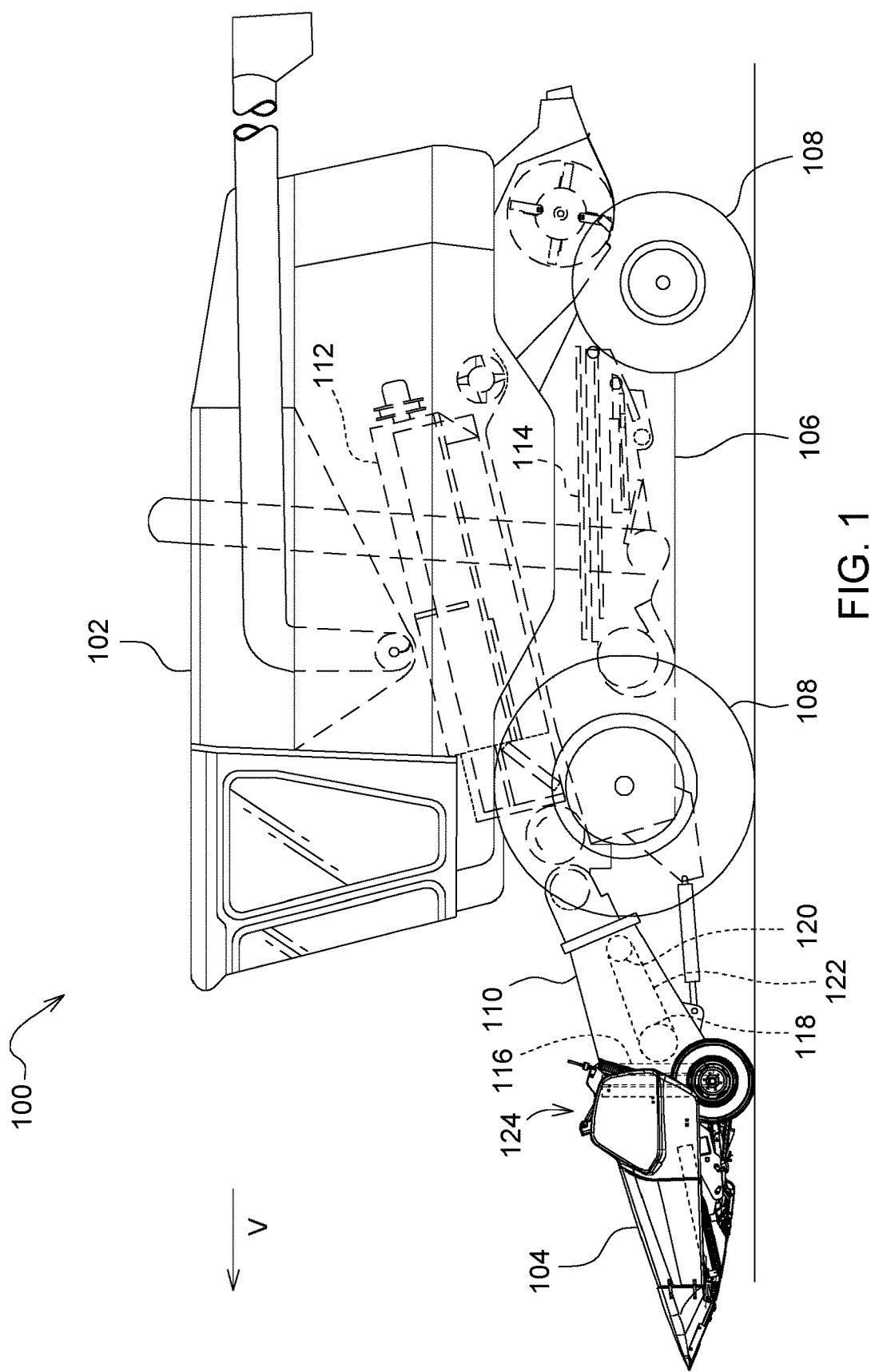
FIG. 1 illustrates an agricultural harvester in side view in accordance with the present invention.
Figure 2:
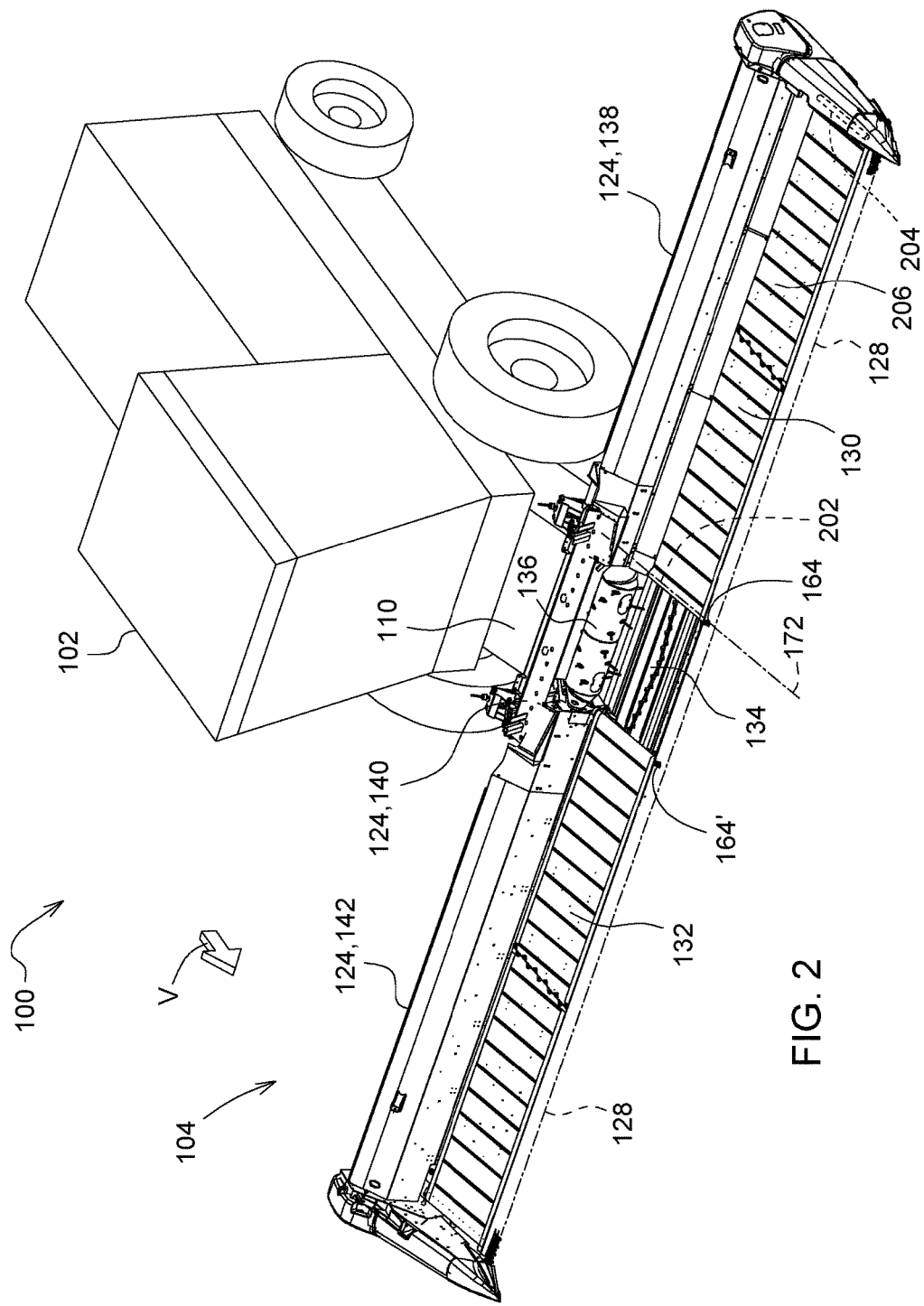
FIG. 2 illustrates the agricultural harvester of FIG. 1 in perspective view and showing details of the agricultural harvesting head.

In FIG. 1, an agricultural harvester 100 comprises an agricultural combine 102 and an agricultural harvesting head 104. The agricultural combine 102 comprises a chassis 106 which is supported on four ground supports 108, as well as a threshing and separating system 112, a cleaning system 114, and a feederhouse 110 extending forward from the front of the agricultural combine 102. The agricultural combine 102 further comprises a grain storage chamber (also known as a "grain tank" or "grain reservoir") that is disposed at the top of the agricultural combine 102 and receives grain that has been threshed, separated, and cleaned.

The agricultural combine 102 is a self-propelled vehicle which is driven over the ground by a power source such as electric motors or internal combustion engines. The ground supports 108 are preferably wheels or tracks. At least two of them are driven in rotation by motors to propel the agricultural combine 102 over the ground.

The feederhouse 110 is pivotally connected to the front of the agricultural combine and extends forward therefrom. The feederhouse 110 is generally in the form of a hollow and generally rectangular box having an endless belt conveyor disposed inside. The hollow rectangular box has an open forward end and an open rear end. The forward end of the feederhouse 110 defines a generally rectangular frame 116 that is configured to support the agricultural harvesting head 104. A front roller 118 is disposed immediately inside the frame 116. A corresponding rear roller 120 is disposed at the rear end of the feederhouse 110. The front roller 118 and the rear roller 120 support opposing ends of a conveyor belt 122. Each of the front roller 118 and the rear roller 120 may be in the form of a narrow shaft with a plurality of sprockets or gears that engage the inner surface of the conveyor belt 122. A rotary motor (electric or hydraulic) is coupled to the rear roller 120 to drive the rear roller 120 in rotation. This rotation causes the conveyor belt 122 to recirculate in an endless fashion around the front roller 118 and the rear roller 120. The conveyor belt 122 has protrusions, such as cleats or lugs that engage a top surface of a mat of cut crop (not shown) that is presented to the frame 116. The movement of the conveyor belt 122 draws the mat into the feederhouse and carries it upward on the floor of the feederhouse until it is conveyed through the open rear end of the feederhouse 110 and sent to the threshing, separating and cleaning systems of the agricultural combine 102.

The frame 116 is generally rectangular and includes a top member and a bottom member that are generally parallel to each other, are spaced apart, and extend generally parallel to the longitudinal extent of the agricultural harvesting head 104, and extend horizontally. That extends side to side a bottom horizontal member that is parallel to the top horizontal member. The frame 116 also includes a left side member and a right side member that are parallel to each other, spaced apart, and extend vertically.

The agricultural harvesting head 104 includes a laterally extending main frame 124 that extends perpendicular to a fore-and-aft harvesting direction of travel "V" of the agricultural harvester 100 and perpendicular to the longitudinal axis of the agricultural combine 102. The agricultural harvesting head 104 further includes an elongate reciprocating knife 128 that extends across almost the entire width of the agricultural harvesting head 104. This reciprocating knife is disposed immediately in front of three cut crop conveyors. These three cut crop conveyors include a left side conveyor 130 that carries cut crop from the left side of the agricultural harvesting head 104 to a central region of the agricultural harvesting head 104, a right side conveyor 132 that carries crop from the right side of the agricultural harvesting head 104 to the central region of the agricultural harvesting head 104, and a central conveyor 134 that receives crop from the left side conveyor 130 and the right side conveyor 132, and conveys the cut crop rearward and underneath a drum conveyor 136. Each of these three conveyors is an endless belt conveyor and is disposed immediately behind the reciprocating knife 128 to receive crop cut by the reciprocating knife 128.

The laterally extending main frame 124 includes three frame sections that are coupled together to pivot with respect to each other about fore-and-aft extending axes. Left frame section 138 extends from the outer left end of the agricultural harvesting head to a central region of the agricultural harvesting head 104. Center frame section 140 extends across a middle portion of the agricultural harvesting head 104. Right frame section 142 extends from the outer right end of the agricultural harvesting head 104 to the central region of the agricultural harvesting head 104.

The left side of conveyor 130 is supported on the left frame section 138. Several rollers, including a proximal roller 202 adjacent to the center frame section 140 and distal roller 204 adjacent to the leftmost end of the left frame section 138 are provided to support an endless belt 206. A motor (not shown) drives the proximal roller 202 in rotation. The proximal roller 202 recirculates in turn the endless belt 206 about the proximal roller 202 and the distal roller 204. Crop material cut by the reciprocating knife 128 in front of the left frame section 138 falls upon the top surface of the endless belt 206 and is drawn toward the center frame section 140.

The inner end of the left frame section 138 is connected to the center frame section 140 to pivot up and down at its outer end with respect to the center frame section 140. The inner end of the right frame section 142 is connected to the center frame section 140 to pivot up and down at its outer end with respect to the center frame section 140.

An upper left link 144 and a lower left link 146 extend between and couple the left frame section 138 and the center frame section 140.

A proximal end of the upper left link 144 is coupled to the center frame section 140 by a first pivot joint 148 and is configured to pivot with respect to the center frame section 140 about a first axis 150 that extends generally in the direction of travel "V".

An opposing distal end of the upper left link 144 is coupled to the left frame section 138 by a second pivot joint 152 and is configured to pivot with respect to the left frame section 138 about a second axis 154 that extends in the direction of travel "V".

A proximal end of the lower left link 146 is coupled to the center frame section 140 by a third pivot joint 156 and is configured to pivot with respect to the center frame section 140 about a third axis 158 that extends in the direction of travel "V".

An opposing distal end of the lower left link 146 is coupled to the left frame section 138 by a fourth pivot joint 160 and is configured to pivot with respect to the left frame section 138 about a second axis 162 that extends in the direction of travel "V".

A hinge joint 164 is disposed adjacent to the reciprocating knife 128 at a forward edge of the agricultural harvesting head 104. The hinge joint 164 couples a forwardly extending member 166 of the center frame section 140 to a forwardly extending member 168 of the left frame section 138.

The attachment points of the proximal ends of the upper left link 144 and the lower left link 146 are closer together (as measured in a vertical direction) than the attachment points of the distal ends of the upper left link 144 and the lower left link 146.

The two attachment points of the upper left link 144 define a first construction line 174 extending through both of the attachment points of the upper left link 144. The two attachment points of the lower left link 146 define a second construction line 176 extending through the attachment points of the lower left link 146.

The first construction line and the second construction line are not parallel. When viewed from the rear of the agricultural harvesting head 104 they intersect each other at a point of intersection 170. Whenever the left frame section 138 pivots up and down with respect to the center frame section 140, these sections pivot with respect to each other about the point of intersection 170.

In the illustrated example, the point of intersection 170 is located closer to the longitudinal and vertical mid-plane of the center frame section 140 than all four of the attachment points of the upper left link 144 and the lower left link 146 to the left frame section 138 and the center frame section 140.

The pivoting axis of the hinge joint 164 is disposed forward of and slightly below the point of intersection 170 of the two construction lines. Thus, the left frame section 138 is constrained by the hinge joint 164, the upper left link 144 and the lower left link 146 to pivot with respect to the center frame section 140 about a pivot line 172 that extends through the point of intersection 170 and through the pivoting axis of the hinge joint 164. The pivot line 172 also extends through or immediately adjacent to the reciprocating knife 128. In this manner, whenever the left frame section 138 pivots with respect to the center frame section 140, the reciprocating knife 128 (which extends across both the left frame section 138 and the center frame section 140) can flex without being torn apart.

The reciprocating knife 128 is typically close to the ground where it can sever plant stalks close to the ground. The rear portion of the three frame sections, the upper left link 144 and the lower left link 146 are commonly elevated above the ground to provide ground clearance. For this reason, the pivot line 172 extends forward and slightly downwardly from the point of intersection 170 to the hinge joint 164.

The left side conveyor 130 is supported on the left frame section 138. The left side conveyor 130 includes several rollers that support an endless belt 206 for recirculating movement around the rollers. The several rollers include a proximal roller 202 that is located adjacent to the center frame section 140 and distal roller 204 that is located adjacent to the leftmost end of the left frame section 138.

The pivot line 172 extends through the proximal roller 202. The rotational axis of the proximal roller 202 is collinear with the pivot line 172. Thus, when the left frame section 138 pivots up and down with respect to the center frame section 140, the proximal roller 202 does not move with respect to the left frame section 138 and the center frame section 140. Further, since the frame sections do not move with respect to each other, the left side conveyor 130 and the central conveyor 134 do not move with respect to each other as well.

A rotary motor (not shown) is coupled to and drives the proximal roller 202 in rotation, which in turn recirculates an endless belt 206 about the proximal roller 202 and the distal roller 204. Crop material cut by the portion of the reciprocating knife 128 located in front of the left frame section 138 falls upon the top surface of the endless belt 206 and is drawn toward the center frame section 140.

Figure 6:
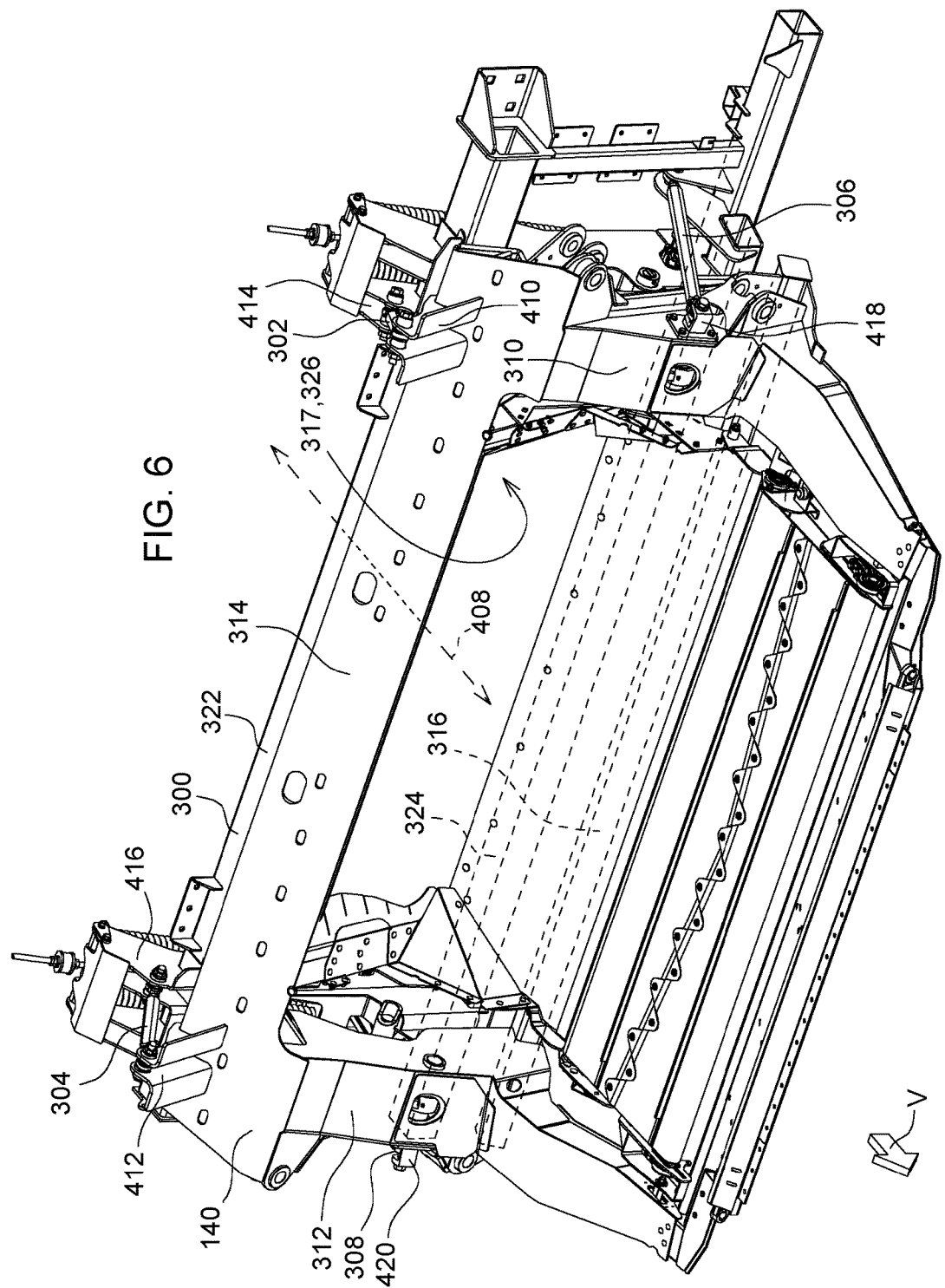
FIG. 6 is a fractional front perspective view of FIG. 3 with the left and right frames and linkages removed.
Figure 7:
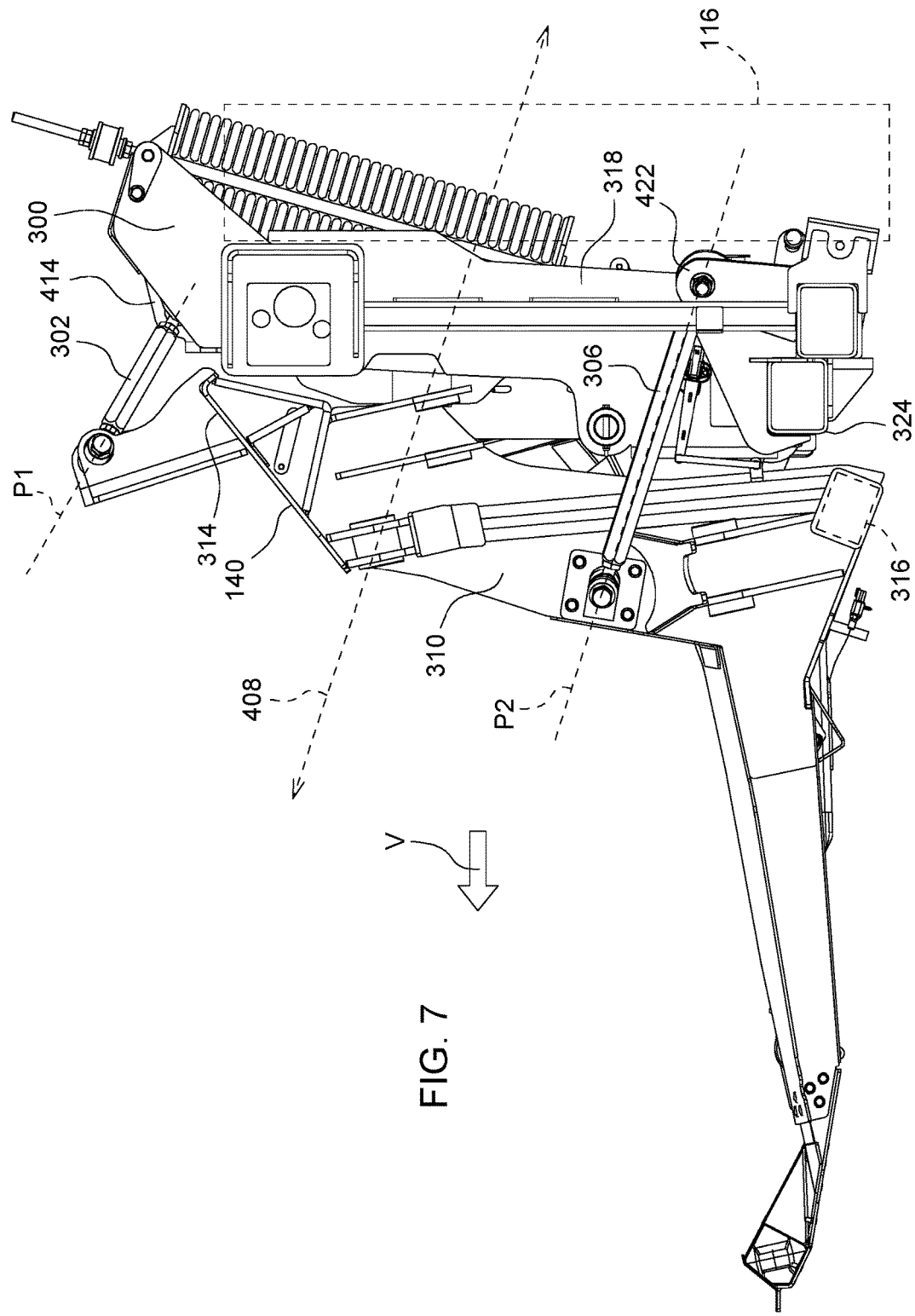
FIG. 7 is a left side view of the arrangement illustrated in FIG. 6.
Figure 8:
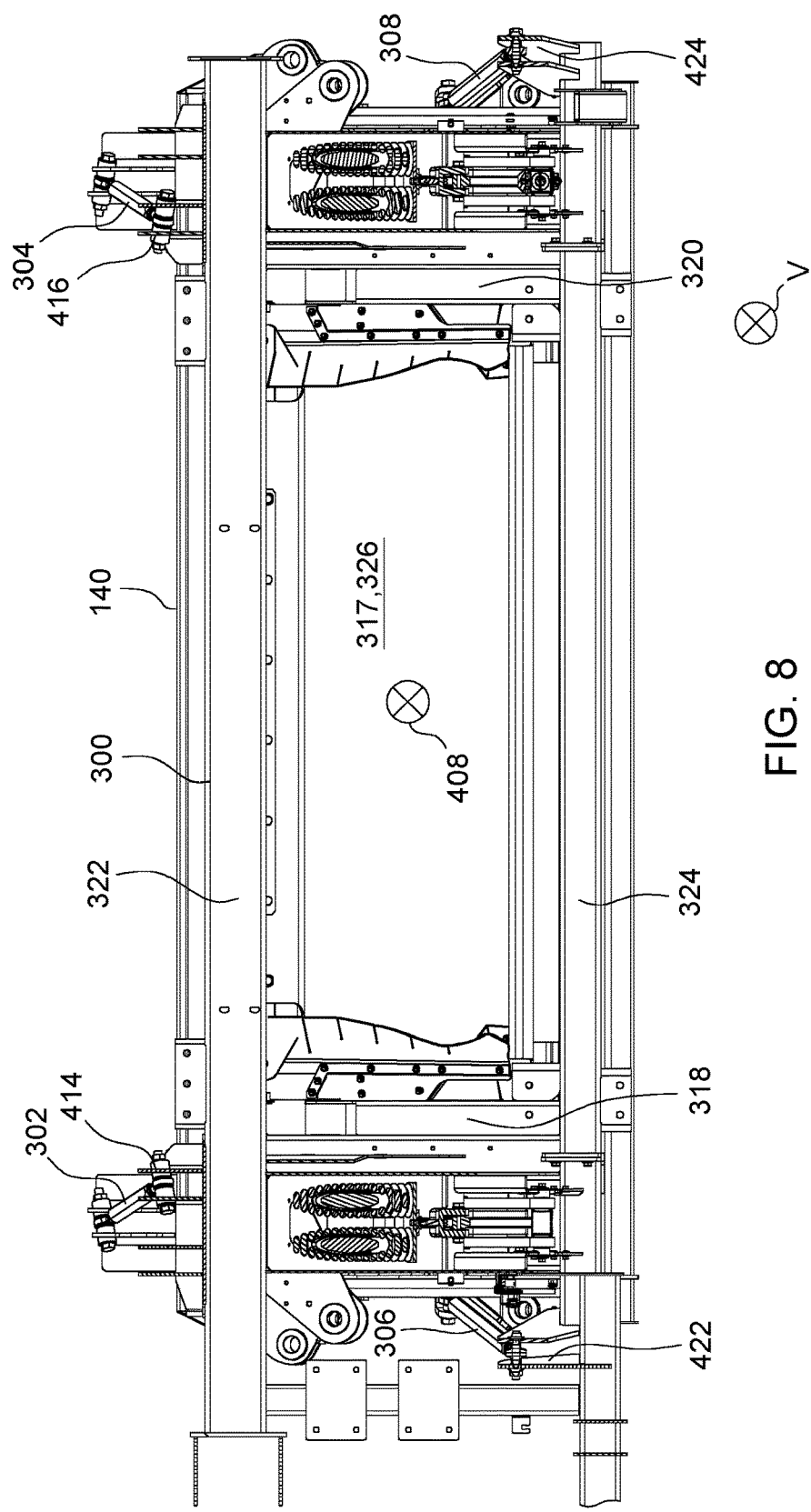
FIG. 8 is a rear view of the arrangement illustrated in FIGS. 6-7.

In FIGS. 6-8, the center frame section 140 is illustrated coupled to and supported on an adapter frame 300. The adapter frame 300 is in turn coupled to and supported on the feederhouse frame 116. Four links, including an upper left link 302, an upper right link 304, a lower left link 306, and a lower right link 308 are coupled to and between the center frame section 140 and the adapter frame 300. A forward end of each of the four links is coupled to the center frame section 140 and a rear end of each of the four links is coupled to the adapter frame 300. The four links extend fore-and-aft.

The center frame section 140 is generally rectangular and extends vertically and transverse to the direction of travel "V". It has two laterally spaced apart vertical side members 310, 312, an upper horizontal member 314 that is fixed at both ends to an upper portion of the side members 310, 312, and a lower horizontal member 316 that is fixed at both ends to a lower portion of the side members 310, 312. The lower horizontal member 316 is spaced apart and disposed below the upper horizontal member 314. The side members 310, 312 are parallel to each other. The upper horizontal member 314 and the lower horizontal member 316 are parallel to each other.

These four members 310, 312, 314, 316 are fixed together to define a rigid rectangular frame having a central aperture 317 configured to receive and transmit all the cut crop harvested by the agricultural harvesting head 104.

The adapter frame 300 is generally rectangular and extends vertically and transverse to the direction of travel "V". It has two laterally spaced apart vertical side members 318, 320, an upper horizontal member 322 that is fixed at both ends to an upper portion of the side members 318, 320, and lower horizontal member 324 that is fixed at both ends to a lower portion of the side members 318, 320. The lower horizontal member 324 is spaced apart and disposed below the upper horizontal member 322. The side members 318, 320 are parallel to each other. The upper horizontal member 322 and the lower horizontal member 324 are parallel to each other.

These four members 318, 320, 322, 324 are fixed together to define a rigid rectangular frame having a central aperture 326 that is configured to receive and transmit all the cut crop material harvested by the agricultural harvesting head 104, and in particular to receive all the cut crop material conveyed through the central aperture 317 of the center frame section 140.

The four links 302, 304, 306, 308 extend between and are coupled to the center frame section 140 and the adapter frame 300. The two lower links 306, 308 have the same length. Each of the four links 302, 304, 306, 308 are preferably formed as turnbuckles with threaded ball joints at each end to permit the length of the links (and thus the angle of the mainframe 124) to be readily adjusted for a variety of crops.

The four links are coupled at their forward ends to the center frame section 140 and at their rear ends to the adapter frame 300. The pivot joints that couple the links to the frames permit the frames to move up and down with respect to each other, and permit the frames to rotate with respect to each other about an axis 408 that extends in a fore-and-aft direction. This axis extends through the central apertures of both the center frame section 140 and the adapter frame 300.

The upper links (links 302, 304) are spaced apart and are pivotally coupled at their forward ends to brackets 410, 412, respectively. Brackets 410, 412 are fixed to and extend upward from the upper horizontal member 314. The brackets are spaced apart on the upper horizontal member 314. Bracket 410 is fixed to the upper horizontal member 314 adjacent to the upper end of the vertical side member 310. Bracket 412 is fixed to the upper horizontal member 314 adjacent to the upper end of the vertical side member 312.

The upper links (links 302, 304) are spaced apart and are pivotally coupled at their rear ends to brackets 414, 416, respectively. Brackets 414, 416 are fixed to and extend upward from the upper horizontal member 322 of the adapter frame 300. The brackets are spaced apart on the upper horizontal member 322. Bracket 414 is fixed to the upper horizontal member 322 adjacent to the upper end of the vertical side member 318. Bracket 416 is fixed to the upper horizontal member 322 adjacent to the upper end of the vertical side member 320.

The two upper links 302, 304 have the same length between their pivot connections to the frames at each end. The two upper links 302, 304 lie in a first common plane "P1" (see FIG. 7).

The lower links (links 306, 308) are spaced apart and are pivotally coupled at their forward ends to brackets 418, 420, respectively. Bracket 418 is fixed to and extends laterally outward from a lower portion of vertical side member 310 adjacent to the left end of lower horizontal member 316. Bracket 420 is fixed to and extends laterally outward from a lower portion of vertical side member 312 adjacent to the right end of lower horizontal member 316.

The lower links (links 306, 308) are spaced apart and are pivotally coupled at their rear ends to brackets 422, 424, respectively. Bracket 422 is fixed to and extends upward from a lower left portion of adapter frame 300. Bracket 424 is fixed to and extends upward from a lower right portion of adapter frame 300. The two lower links 306, 308 have the same length between their pivot connections to the frame at each end.

The two lower links 306, 308 have the same length between their pivot connections to the frames at each end. The two lower links 306, 308 lie in a second common plane When viewing the center frame section 140 and the adapter frame 300 from the rear (e.g. as in FIG. 8), the links 302, 304, 306, 308 are disposed at the upper left, upper right, lower left, and lower right corners of the apertures 317, 326. The links collectively surround the apertures 317, 326.

All four of the links 302, 304, 306, 308 extend generally fore-and-aft and are generally parallel. However, they are not perfectly parallel, nor do they extend perfectly fore-and-aft. In fact, they are slightly nonparallel in order to provide particular benefits that four perfectly parallel links would not provide.

In particular, the two upper links 302, 304 extend forward and outward. Thus, the distance between the two upper links at their pivotal attachment points on the center frame section 140 is greater than the distance between the two upper links at their pivotal attachment points on the adapter frame 300.

The two lower links 306, 308 extend forward and inward. Thus, the distance between the two lower links at their attachment points on the center frame section 140 is less than the distance between the two lower links at their attachment points on the adapter frame 300.

By arranging the spacing of the attachment points (and therefore the direction the two upper links and the two lower links extend) as shown, the center frame section 140 and the adapter frame 300 cannot be translated side to side with respect to each other. If a great force was applied to force side to side (lateral) translation of the two frames with respect to the other, either one or more of the links will break and/or one or more of the frames will break. The links and the frames are robust enough that during normal operation no such lateral translation nor any link or frame breakage will occur under normal operational loading.

In an alternative arrangement (not shown) the angles of the four links are reversed, in other words the two upper links could be attached to the two frames such that they extend forward and inward, and the two lower links could be attached to the two frames such that they extend forward and outward. "Outward", as the term is used with regard to the orientation of the four links, means laterally away from the lateral midpoint of the agricultural harvesting head. "Inward", as the term is used with regard to the orientation of the four links, means laterally toward the lateral midpoint of the agricultural harvesting head.

In another alternative arrangement, the center frame section 140 can extend substantially the entire width of the agricultural harvesting head. The left frame section and the right frame section can be completely eliminated in this arrangement. In another alternative arrangement, the left frame section, right frame section, and the center frame section can be fixed together and the pivots between these adjacent frame sections be eliminated.

In the discussion above, various components and axes are described as extending in a fore-and-aft direction, or extending in a direction parallel to a direction of travel "V", or extending horizontally or longitudinally, will or extending laterally. During normal operation, these components are expected to move. Typically, they can be pivoted or tilted with respect to each other, with respect to the ground, or with respect to the combine during normal operation and therefore are not precisely horizontal, vertical, longitudinally extending or laterally extending in all modes of operation.

Figure 3:
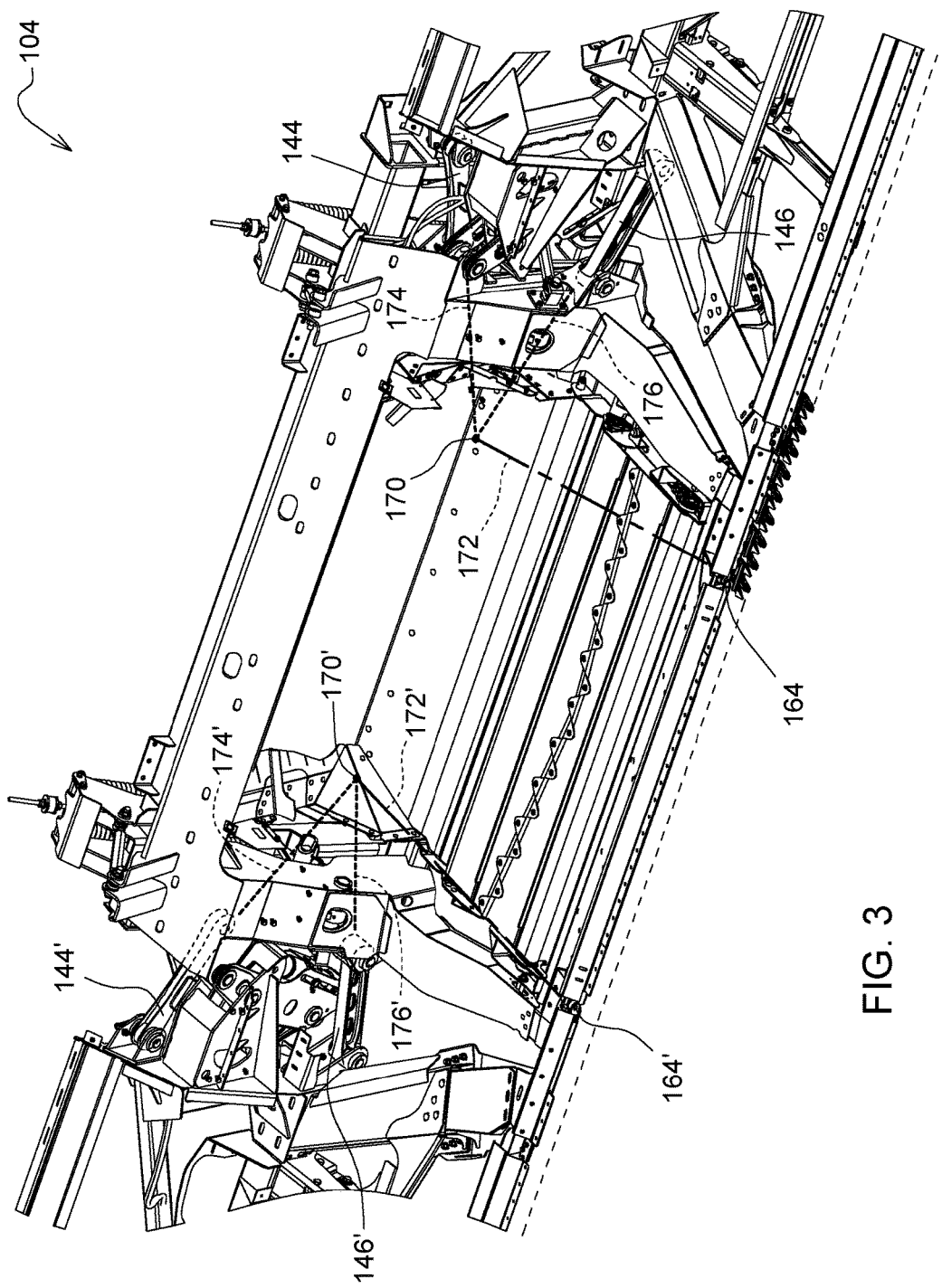
FIG. 3 is a fractional front perspective view of the frames of the agricultural harvester of FIGS. 1-2 with the conveyors removed.
Figure 4:
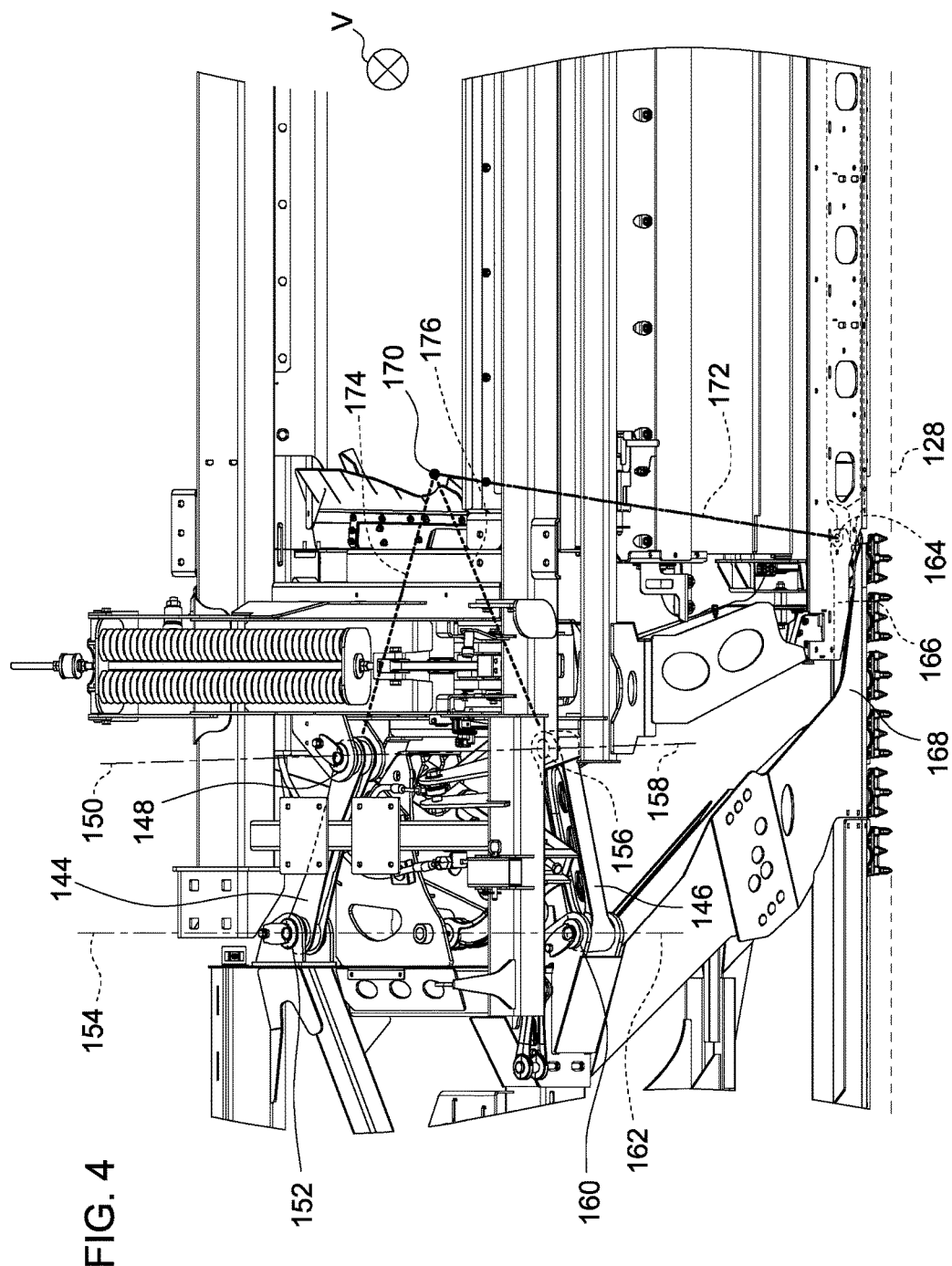
FIG. 4 is a fractional front perspective view of the view of the center frame and adapter frame shown in FIG. 3.
Figure 5:
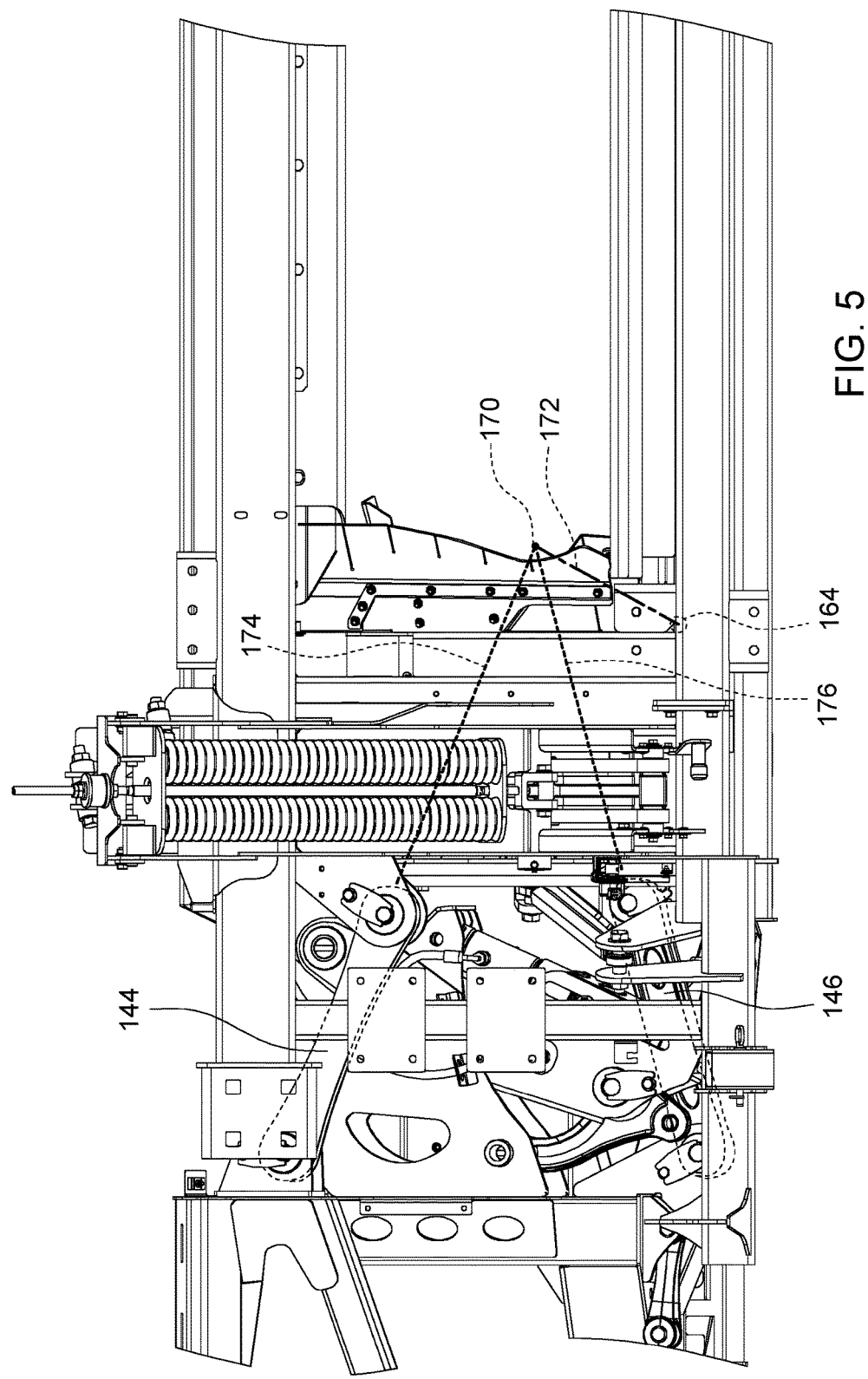
FIG. 5 is a slightly elevated fractional rear view of the frames shown in FIGS. 3-4.

The agricultural harvesting head 104 described above is in all material respects mirror symmetric about a longitudinally and vertically extending plane that passes through a lateral midpoint of the center frame section 140. Thus, the description above regarding the left frame section 138, left side conveyor 130, and center frame section 140, apply equally to the right frame section 142, the right side conveyor 132 and the center frame section 140. For convenience, these mirror symmetric components are shown in FIG. 3 and identified by their left side component number followed by a single quotation mark (e.g. 144', 146', 164', 170', 172', 174', and 176').

The invention claimed is:

1. An agricultural harvesting head for an agricultural harvester comprising:
   a left frame section disposed to receive crop harvested on a left side of the agricultural harvesting head;
   a right frame section disposed to receive crop harvested on the right side of the agricultural harvesting head;
   a center frame section that is coupled to and disposed to receive the crop harvested from the left frame section and from the right frame section;
   an adapter frame disposed adjacent the center frame section;
   an upper left link having a forward end pivotally coupled to the center frame section and a distal end pivotally coupled to the adapter frame;
   an upper right link having a forward end pivotally coupled to the center frame section and a distal end pivotally coupled to the adapter frame;
   a lower left link having a forward end pivotally coupled to the center frame section and a distal end pivotally coupled to the adapter frame; and
   a lower right link having a forward end pivotally coupled to the center frame section and a distal end pivotally coupled to the adapter frame, and
   wherein the distance between the forward ends of the upper left link and the upper right link is different than the distance between the distal ends of the upper left link and the upper right link.

2. The agricultural harvesting head of claim 1, wherein each of the four links extends generally fore-and-aft.

3. The agricultural harvesting head of claim 1, wherein the upper left link and the upper right link extend forwardly and outwardly from their mounting points on the adapter frame to their mounting points on the center frame section.

4. The agricultural harvesting head of claim 1, wherein the lower left link and the lower right link extend forwardly and outwardly from their mounting points on the adapter frame to their mounting points on the center frame section.

5. The agricultural harvesting head of claim 1, wherein the center frame section further comprises two laterally spaced apart vertical side members, an upper horizontal member and a lower horizontal member, wherein the two vertical side members and the upper and lower horizontal members are fixed together at their ends to define a central aperture that is dimensioned to pass substantially all crop harvested by the agricultural harvesting head, wherein the central aperture has an upper left corner, an upper right corner, a lower left corner, and a lower right corner, and wherein each of the four links is pivotally coupled at its forward end adjacent to the center frame section at one of the four corners.

6. The agricultural harvesting head of claim 1, wherein the adapter frame further comprises two additional laterally spaced apart vertical side members, an additional upper horizontal member, and an additional lower horizontal member, wherein the two additional vertical side members and the additional upper and lower horizontal members are fixed together at their ends to define a central aperture that is dimensioned to pass substantially all crop harvested by the agricultural harvesting head, wherein the central aperture has an upper left corner, an upper right corner, a lower left corner, and a lower right corner, and wherein each of the four links is pivotally coupled at its rear end adjacent to the adapter frame at one of the four corners.

7. The agricultural harvesting head of claim 1, wherein the upper left link and the upper right link are coplanar with a first plane.

8. The agricultural harvesting head of claim 7, wherein the lower left link and the lower right link are coplanar with a second plane.

9. The agricultural harvesting head of claim 8, wherein the first plane and the second plane extend forward and upward in at least one operating position.

10. The agricultural harvesting head of claim 1, wherein the upper left link and the upper right link are shorter than the lower left link and the lower right link.

11. The agricultural harvesting head of claim 10, wherein the upper left link and the upper right link are the same length, and wherein the lower left link and the lower right link are the same length.

12. The agricultural harvesting head of claim 1, wherein the upper left link and the upper right link comprise turnbuckles.

13. The agricultural harvesting head of claim 12, wherein the lower left link and the lower right link comprise turnbuckles.

14. An agricultural harvesting head for an agricultural harvester comprising:
   a left frame section disposed to receive crop harvested on a left side of the agricultural harvesting head;
   a right frame section disposed to receive crop harvested on the right side of the agricultural harvesting head;
   a center frame section that is coupled to and disposed to receive the crop harvested from the left frame section and from the right frame section;
   an adapter frame disposed adjacent the center frame section;
   an upper left link having a forward end pivotally coupled to the center frame section and a distal end pivotally coupled to the adapter frame;
   an upper right link having a forward end pivotally coupled to the center frame section and a distal end pivotally coupled to the adapter frame;
   a lower left link having a forward end pivotally coupled to the center frame section and a distal end pivotally coupled to the adapter frame; and
   a lower right link having a forward end pivotally coupled to the center frame section and a distal end pivotally coupled to the adapter frame, and
   wherein the distance between the forward ends of the lower left link and the lower right link is different than the distance between the distal ends of the lower left link and the lower right link.

15. The agricultural harvesting head of claim 14, wherein the distance between the forward ends of the lower left link and the lower right link is different than the distance between the distal ends of the lower left link and the lower right link.

* * * * *